(12) United States Patent
Zolfaghari et al.

(10) Patent No.: US 7,577,360 B2
(45) Date of Patent: Aug. 18, 2009

(54) SYSTEM AND METHOD FOR SECOND ORDER MULTI-LAYER TRAFFIC GROOMING FOR OPTICAL NETWORK OPTIMIZATION

(75) Inventors: Ali Zolfaghari, San Ramon, CA (US); Andre Fuetsch, Houston, TX (US); Christine Bouamalay, Oakland, CA (US); Miguel Tomas Molina, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 778 days.

(21) Appl. No.: 10/884,381

(22) Filed: Jul. 2, 2004

(65) Prior Publication Data

US 2006/0002310 A1 Jan. 5, 2006

(51) Int. Cl.
*H04B 10/00* (2006.01)
(52) U.S. Cl. ............................ 398/59; 398/58; 398/70
(58) Field of Classification Search .................. 398/58, 398/25, 59, 70
See application file for complete search history.

(56) References Cited

U.S. PATENT DOCUMENTS

| | | | |
|---|---|---|---|
| 6,058,260 A * | 5/2000 | Brockel et al. | 703/4 |
| 6,654,354 B1 * | 11/2003 | Watkins et al. | 370/258 |
| 6,711,324 B1 | 3/2004 | Zang et al. | |
| 6,798,784 B2 * | 9/2004 | Dove et al. | 370/463 |
| 2002/0135835 A1 | 9/2002 | Lauder et al. | |

* cited by examiner

*Primary Examiner*—Agustin Bello
(74) *Attorney, Agent, or Firm*—Toler Law Group

(57) ABSTRACT

A method of automatically generating a computer based layout of an optical communication network is provided. First, communications traffic demand forecast data for an optical communication network is received. Network data corresponding to a deployed optical communication network is also received. Thereafter, a network plan can be automatically generated. The network plan corresponds to a modified network that may be deployed. Also, the network plan can be derived from the network data. Further, the network plan can be constructed in response to the performance of a grooming operation that includes a first level of grooming at an optical level of the modified network and a second level of grooming at an electrical level of the modified network.

12 Claims, 7 Drawing Sheets

SYSTEM AND METHOD FOR SECOND ORDER MULTI-LAYER TRAFFIC GROOMING FOR OPTICAL NETWORK OPTIMIZATION

FIELD OF THE DISCLOSURE

The present disclosure relates to the design of multi-level transport networks.

BACKGROUND

The standards set forth by the Synchronous Optical Network (SONET) define optical carrier (OC) levels and the electrically equivalent synchronous transport signals (STS) for the fiber-optic based transmission hierarchy. For example, an OC-1 is equivalent to an STS-1 and provides a data transmission rate of 51.84 Mega bits per second (Mbps). Higher line rates are integer multiples of the base rate of 51.84 Mbps. In other words, an OC-3, and the corresponding STS-3, has a data transmission rate equal to 3 times 51.84 Mbps or 155.52 Mbps. Under the SONET standard, OC-3, OC-12, OC-48, and OC-192 are the most widely supported fiber-optic rates. However, other rates exist, e.g., OC-9, OC-18, OC-24, and OC-36.

As such, in a telecommunication network, there can be numerous types of connections that are established to handle signal traffic at the different transmission rates. These connections can include any combination of OC-1 connections, OC-3 connections, OC-12 connections, OC-48 connections, and/or OC-192 connections. In order to efficiently handle the signal traffic, it is often necessary to groom the signal traffic traveling over the network. Grooming involves rearranging and repacking low-speed demand, e.g., DS-1 demand, into higher speed connections, e.g., STS-1 connections, to obtain high utilization or fill ratios. Grooming allows demand from various destinations to be combined over a single transport connection.

In SONET ring based networks there are two ways to groom demand: centralized ring bandwidth management and distributed ring bandwidth management. In centralized ring bandwidth management, also known as "full hubbing," all DS-1 demand originating from a node is packed into one or more STS-1 demands and transported to a central hub node. At the central hub node, the incoming STS-1 demands are dropped from the ring and connected to a wideband digital cross-connect system (WDCS). Within the WDCS, the individual DS-1 demands are cross-connected to groomed outgoing STS-1 demands, which are added back to the ring. Then, a number of co-destined demands can be transported to their common final destination.

An alternative to hubbing is distributed bandwidth management. In distributed bandwidth management, DS-1 demands are routed directly within the ring over a shared or collector STS-1. A collector STS-1 is an STS-1 time slot that is accessible by more than one pair of nodes. In order to access a collector STS-1, however, an add drop multiplexer (ADM) must be capable of time slot assignment (TSA) at the VT-1.5 virtual tributary level.

In a multi-level network, i.e., a network including an electrical level and one or more optical levels, the concept of traffic grooming, can be used when there is a significant volume of low-speed traffic between two nodes, e.g., central offices (COs). The demand in the multi-level network can be groomed to share the resources in the electrical and optical levels, thereby reducing the cost of the network. However, if each level is analyzed independently, it is possible that saving costs in one level, e.g., an optical level, can have a negative impact on the costs associated with the other level, e.g., the electrical level, and vice-versa. On top of this, if a SONET network is already installed in the field, it is necessary to make use of the SONET network in order to provide a smooth transition from the installed SONET network to a wavelength division multiplexing (WDM) based full optical network.

Accordingly, there is a need for an improved system and method for grooming traffic in a multi-level network, e.g., during the design of a multi-level network.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
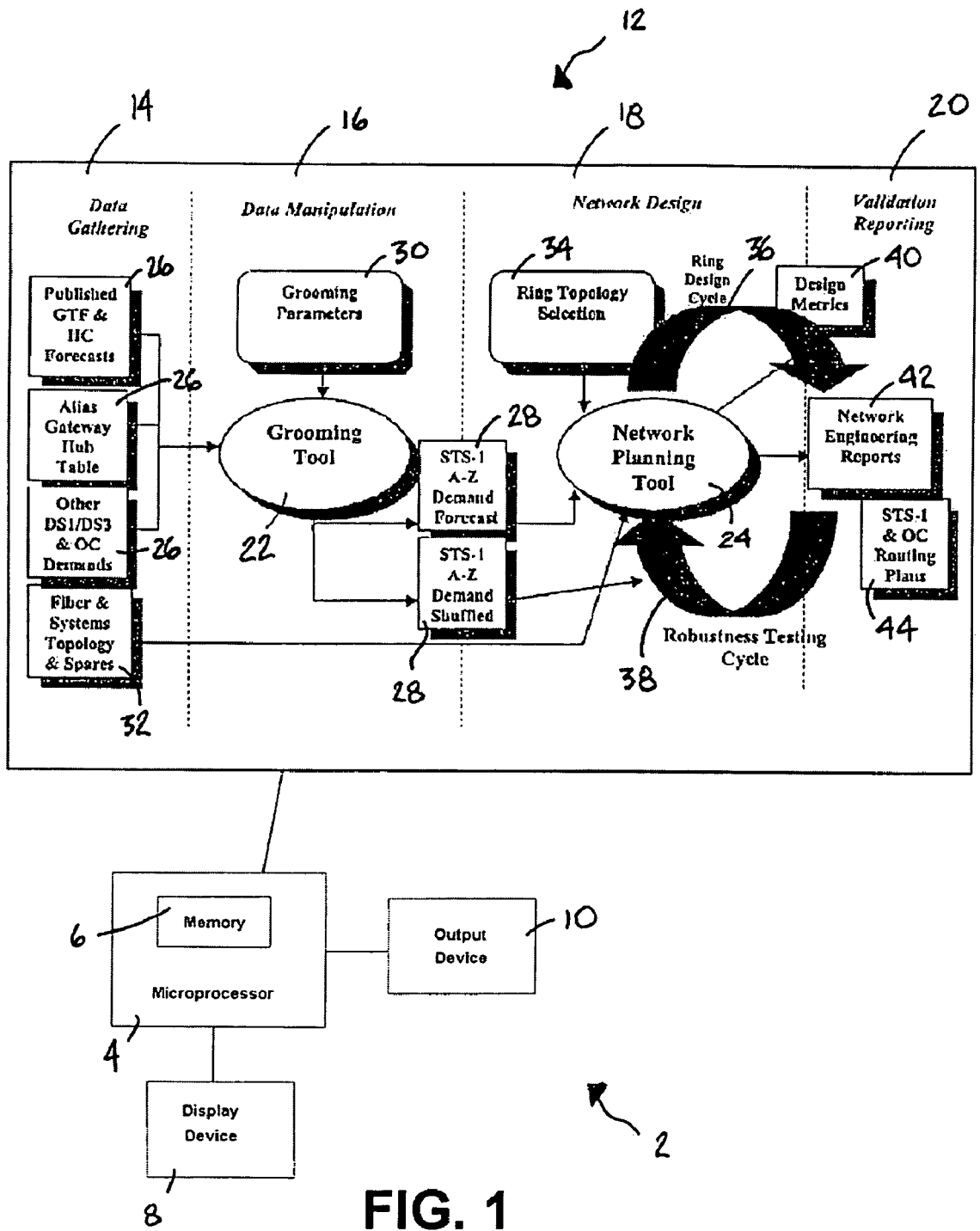
FIG. 1 shows the main building blocks for application of a single layer grooming scheme used in a SONET transport network optimization process including computer systems that pre-process network data and perform network analysis and planning.

A method of automatically generating a computer based layout of an optical communication network is provided. First, communications traffic demand forecast data for an optical communication network is received. Network data corresponding to a deployed optical communication network is also received. Thereafter, a network plan can be automatically generated. The network plan corresponds to a modified optical network that may be deployed. Further, the network plan can be constructed in response to the performance of a grooming operation that includes multi-layer of grooming at selected nodes of the modified network.

The modified network can include a third node and a fourth node. The third node can be coupled to the first node, and the modified network can include a first connection between the first node and the third node. Also, the modified network can include a second connection between the first node and the second node and a third connection between the second node and the third node. The modified network can also include a fourth node and a fourth connection between the second node and the fourth node. And, the modified network can include a fifth connection between the fourth node and the third node. Also, the second node and the fourth node can be hub nodes.

In this aspect of the present embodiment, the first and second connections can be direct connections and the third connection can be a "spoke" connection that connects a regular node to a hub node. The spoke connection can have a smaller traffic capacity than the direct connections. Specifically, in a SONET network the spoke connection is an STS-1 connection.

Additionally, in this aspect of the present embodiment, the first node can be a central office at a first location and can include an optical add drop multiplexer. The second node can be a central office at a destination location and can include an add drop multiplexer. Further, the third node can be a hub that includes a digital cross connect (DCS) and a multi-service transport switch (MSTS) or and optical cross connect (OXC). Finally, the second level of the multi-level network can be a SONET layer and the first level can be an optical communication level including optical add drop multiplexer elements.

In another aspect of the present embodiment, a method of grooming a network plan of an optical communication network is provided. A first set of direct connections can be formed between an origination central office and a destination central office. The set of direct connections can include one or more high-speed connections and one or more lower speed connection. Next, a spoke connection can be formed between the origination central office and a hub node. The spoke connection can carry residual data traffic not carried over any of the direct connections. Moreover, the residual traffic can be groomed with other traffic and carried together with such other traffic over other connections carrying traffic to the destination central office.

In this aspect of the present embodiment, a first cost estimate is determined and includes the cost of deploying each of the set of direct connections between the origination central office and the destination central office. Also, a second cost estimate is determined and includes the cost of deploying each of the spoke connections. An incremental cost of a light path to carry traffic from the hub node to the destination central office is added to the cost of deploying each of the spoke connections. Thereafter, the first cost estimate can be compared to the second cost estimate and the lower cost can be selected.

In still another aspect of the present embodiment, a method of grooming multi-layer traffic is provided and can be used to generate network node data, connection data, and wavelength capacity data that corresponds to a combined SONET and wavelength division multiplexed network. Traffic demand forecast data can be received, and network data is received corresponding to a SONET network and to a wavelength division multiplexed network. Channels of low-speed traffic demand from the SONET network can be aggregated into higher speed connections within the wavelength division multiplexed network to create a network plan for the combined SONET and wavelength division multiplexed network.

Referring now to FIG. 1, a computer system for executing network planning software is shown and is generally designated 2. As shown, the computer system 2 includes a microprocessor 4 that has a memory 6, e.g., a hard disk drive. FIG. 1 shows that the computer system 2 further includes a display device 8, e.g., a monitor, upon which a user can view network plans developed using the network planning software described in detail below. Additionally, the computer system 2 can include an output device 10, e.g., a printer.

FIG. 1 further illustrates functionality of a non-limiting, exemplary embodiment of network planning software (S-TOP), designated 12, that can reside within the microprocessor 4, e.g., within the memory 6. In general, the network planning software 12 includes a data gathering module 14, a data manipulation module 16, a network design module 18, and a validation and reporting module 20. As shown, the network planning software 12 can include a grooming tool 22, e.g., within the data manipulation module 16, and a network planning tool 24, e.g., within the network design module 18. As described in detail below, the grooming tool 22 can be used to groom, or otherwise transform, network demand data 26 that is input to the grooming tool 22, e.g., via the data gathering module 14, in order to produce interim demand files 28. The interim demand files 28, in turn, can be input to the network planning tool 24 where they are used during the design of a network plan. As further shown in FIG. 1, one or more grooming parameters 30 can be input to the grooming tool 22 and can be used to determine how the demand data 26 is groomed by the grooming tool 22. A description of the grooming tool logic is provided below.

Referring still to FIG. 1, network architecture data 32, such as fiber and system topology data, can be input to the network planning tool 24 in addition to the interim demand files 28. Also, as the network planning tool 24 is used to design a network plan, a user can make a ring topology selection 34 based on the design choices presented by the network planning tool 24. As further shown in FIG. 1, during the design of a network plan by the network planning tool 24, a ring design cycle 36 and a robustness testing cycle 38 can be performed. FIG. 1 also shows that the network planning software 12 can include plural design metrics 40 that can be used by the network planning tool 24 during the ring design cycle 36. Once the network planning tool 24 has satisfactorily completed the ring design cycle 36 and the robustness testing cycle 38, network engineering reports 42 can be created by the validation and reporting module 20 and further, can be output by the network planning tool 24, e.g., via the output device 10. The network engineering reports 42 can include STS-1 & OC routing plans.

Figure 2:
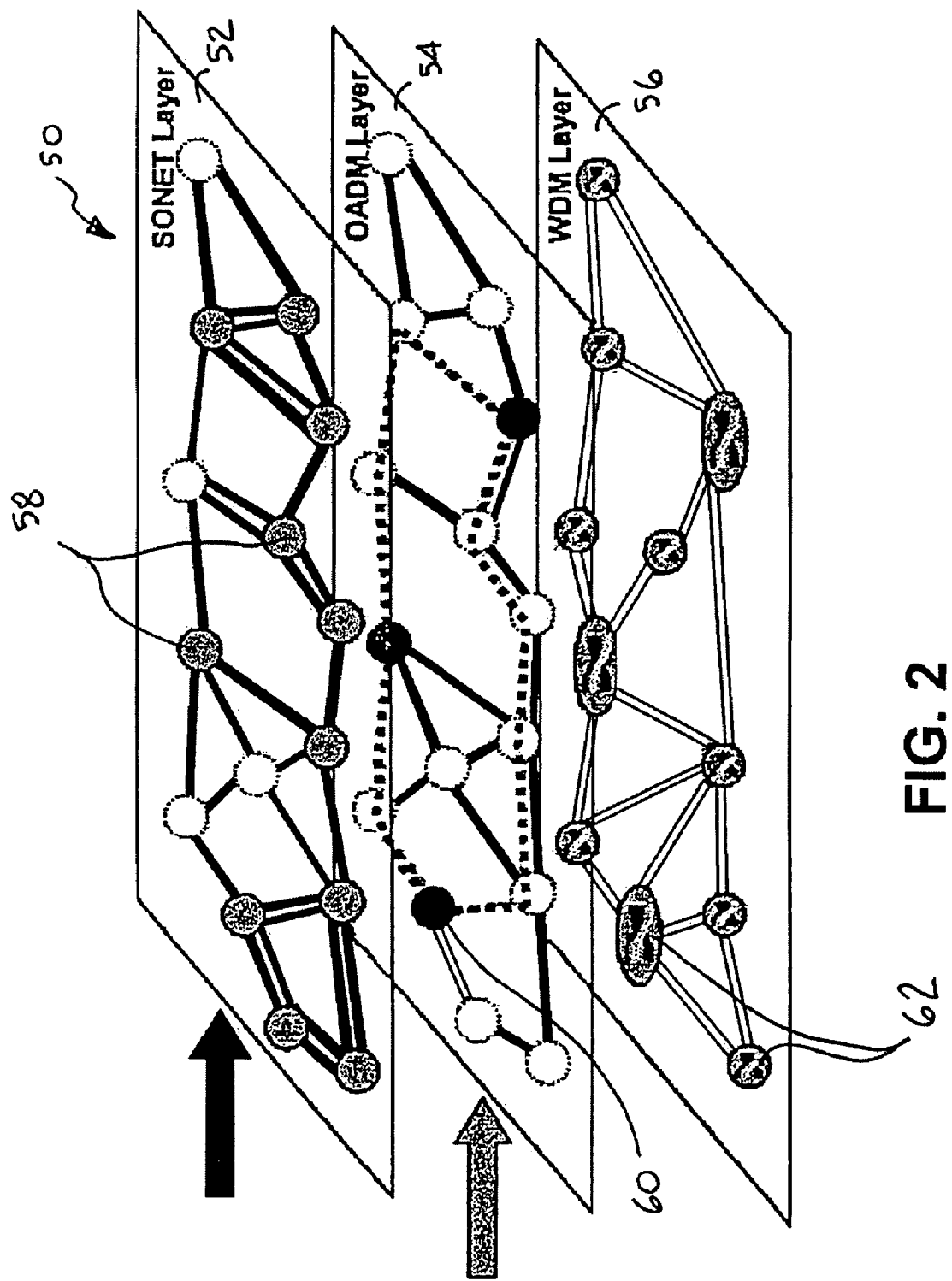
FIG. 2 is a diagram representative of three distinct levels of a transport network that can be a candidate for implementation of multi-layer grooming approach.

FIG. 2 shows an embodiment of a multi-level transport network, generally designated 50, that can be groomed using the grooming tool 22 described above in connection with FIG. 1. As illustrated in FIG. 2, the multi-level transport network 50 can include an electrical level 52, e.g., a SONET level; a first optical level 54, e.g., an optical add/drop multiplexer (OADM) level; and a second optical level 56, e.g., a wavelength division multiplexing (WDM) level 56. FIG. 2 depicts that the electrical level 52 can include plural electrical nodes 58 interconnected to each other. The electrical nodes 58 can include plural SONET add/drop multiplexer (ADM) nodes, plural digital cross-connect system (DCS) nodes, a combination of SONET ADM nodes and DCS nodes, etc. The first optical level 54 can include plural optical nodes 60 that are interconnected to each other. In one embodiment, the optical nodes 60 can include OADM nodes, optical edge device nodes, a combination of OADM nodes and optical edge device nodes, etc. As shown in FIG. 2, the second optical level 56 can further include plural optical nodes 62. The optical nodes 62 of the second optical level 56 can include plural optical cross-connect (OXC) nodes or plural multi-service transport switch (MSTS) nodes that are interconnected to each other.

It can be appreciated that the interconnection between the electrical level 52 and the optical levels 54, 56 can be facilitated by specified nodes, i.e., hub nodes or gate nodes. Further, the gate nodes can have different optical and electrical functionalities. For example, for low-speed traffic originating in the electrical level 52 to be routed through the optical levels 54, 56, electrical-optical (EO) conversions and optical-electrical (OE) conversions are necessary at designated gate nodes. Between optical nodes 60, 62, high-speed traffic can be transmitted only through optical levels 54, 56. However, the low-speed traffic between electrical nodes 58 can be transmitted either through the electrical level 52 or through the optical levels 54, 56. The low-speed traffic demands can be bundled together into higher level routes or even light paths, e.g., an OC-48 (2.5 Gbps) connection or an OC-192 (10

Gbps) connection, taking a common route in an optical levels 54, 56 thereby reducing costs.

As previously stated, optical-electrical-optical (OEO) conversions are needed in each designated gate node in order to transfer signals between the electrical level 52 and the optical levels 54, 56. In the present disclosure, demand originating in the electrical level 52 can jump to the optical levels 54, 56 and back, i.e., undergo an OEO conversion, a limited number of times. The intent is to avoid large delays during transmission caused by the OEO conversions. Additionally, due to the risk of problems associated with the failure of an OEO converter, a large number of OEO conversions can have a strong impact on network survivability and performance. Each level can provide the protection/restoration mechanism for the connections that exist in that particular level—without exchanging information with other levels.

Typically, when low-speed traffic is groomed into a light path and routed through the optical levels, the intermediate optical nodes cannot access the low-speed traffic. If part of the low-speed traffic has to be dropped at an intermediate node, the entire light path is converted to an electrical signal. However, in the new generation of digital cross-connect systems (DCSs) with optical interfaces, the low-speed demands can be processed and a new light path can be created to transmit the remaining demand to the final destination.

Figure 3:
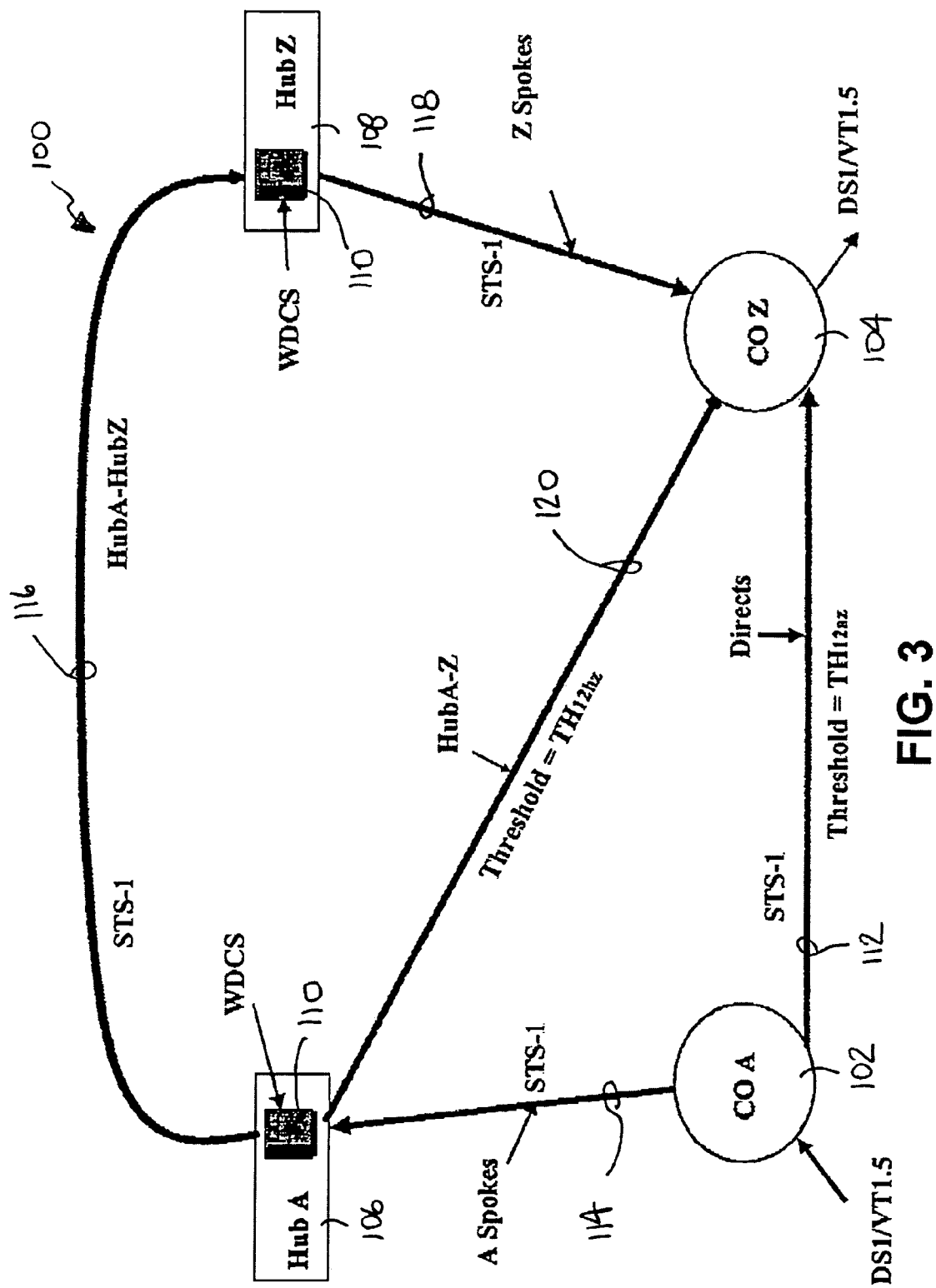
FIG. 3 is a diagram of an embodiment of a second order single layer grooming model.

Referring now to FIG. 3, an embodiment of a second order single layer grooming model is shown and is generally designated 100. As depicted in FIG. 3, the second order single layer grooming model 100 includes an origination central office (CO) 102 and a destination CO 104. The second order single layer grooming model 100 includes a first hub node 106 and a second hub node 108. Each hub node 106, 108 can include a wide-band digital cross-connect system (WDCS), which can allow cross-connecting of the tributary services at the tributary level and perform traffic grooming.

FIG. 3 shows that the origination CO 102 can be connected to the destination CO 104 via a direct CO-to-CO connection 112, e.g., an STS-1 connection. The origination CO 102 can also be connected to the first hub node 106 via a first spoke connection 114, e.g., an STS-1 connection. In turn, the first hub 106 can be connected to the second hub 108 via a hub-to-hub connection 116, e.g., an STS-1 connection. Also, the second hub 108 can be connected to the destination CO 104 via a second spoke connection, e.g., an STS-1 connection. Finally, FIG. 3 illustrates that the first hub 106 can be connected to the destination CO 104 by a hub-to-CO cross-connection 120, e.g., an STS-1 connection.

It is to be understood that for the second order single layer grooming model 100, grooming DS1/VT1.5 demand traffic increases network utilization efficiency by finding a most economic mix between building direct STS-1 connections between COs or spoke STS-1 connections to transport DS1/VT1.5 traffic to a WDCS located in an intermediate hub node for grooming with other demands to be sent to the same destination. Further, it is to be understood that there are two distinct decision thresholds in the second order single layer grooming model 100 shown in FIG. 3. First, there is the origination CO 102 to destination CO 104 grooming threshold (TH12az). Second, there is the first hub node 106 to destination CO 104 grooming threshold (TH12hz).

The decision to build a direct STS-1 connection between the origination CO 102 and the destination CO 104 in order to transport a particular set of DS1/VT1.5 end-to-end demands is based on a "TH12az" value. In other words, if the demand during a given planning year is more than "TH12az" DS-1s, a direct STS-1 connection is built. On the other hand, the demand lower than the threshold is routed to a WDCS located in a hub node, e.g., the first hub node 106, through an STS-1 spoke connection to be groomed with other demands. Further, if the total demand at the first hub node 106 exceeds a "TH12hz" threshold value, a hub-to-CO STS-1 connection can be built. Otherwise, the demand at the first hub node 106 is routed to the second hub node 108 via the hub-to-hub connection 116.

This algorithm can be considered a second order algorithm, since it considers two levels of hubbing for each demand. For example, as stated above, if a first round of grooming of DS-1s in the first hub node 106 does not exceed the TH12hz threshold and a hub-to-CO cross-connection is not justified, the demand is routed to the second hub node 108 using the hub-to-hub connection 116. In one embodiment of the second order single layer grooming model 100, the first spoke 114 carries residual or small amounts of bundled traffic that did not pass the first TH12az threshold test. Moreover, in one embodiment of the second order single layer grooming model, the second spoke 118 can be an STS-1 connection between the second hub node 108 and the destination CO 104 and can transport remaining DS1/VT1.5 traffic without a grooming threshold check. In one embodiment, the second order single layer grooming model 100 can be considered "symmetric" if TH12az=TH12hz.

Figure 4:
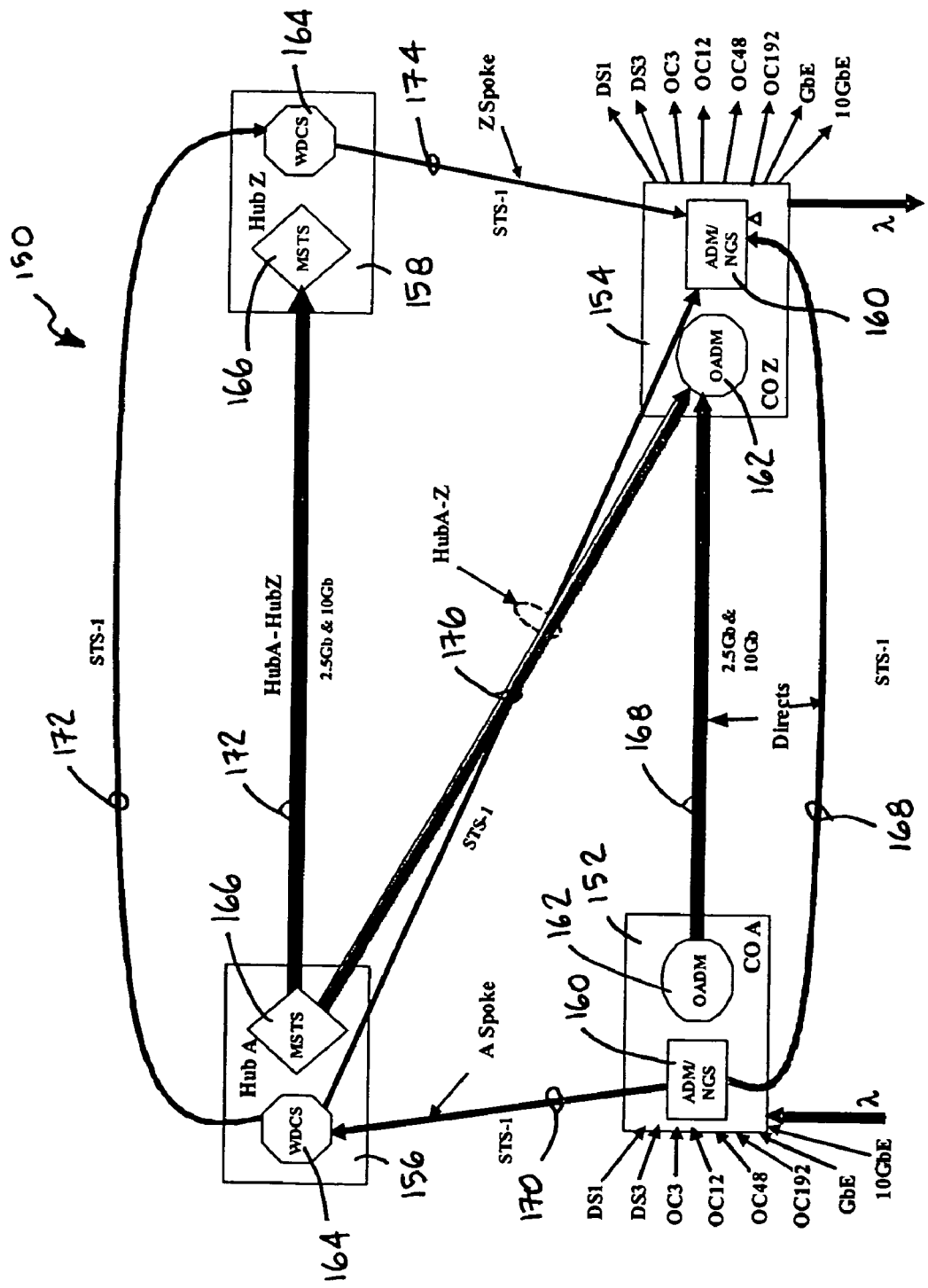
FIG. 4 is a diagram of an embodiment of a second order multi-layer grooming model.

FIG. 4 depicts an exemplary embodiment of a second order multi-layer grooming model, generally designated 150. As illustrated in FIG. 4, the second order multi-layer grooming model 150 includes an origination central office (CO) 152 and a destination CO 154. Moreover, the second order multi-layer grooming model 150 includes a first hub node 156 and a second hub node 158. As demonstrated in FIG. 4, each CO 152, 154 can include a SONET ADM 160, or other type of next generation SONET equipment (NGS), and an OADM 162. Further, each hub node 156, 158 can include a WDCS 164 and an MSTS 166 with OXC functionality. It is to be understood that the WDCSs 164 and the MSTSs 166 are capable of multi-layer grooming in both electrical and optical levels. In the present embodiment, the input traffic to the origination CO 152 can include DS-1, DS-3, OC-3, OC-12, OC-48 (2.5 Gbps), OC-192 (10 Gb), 1 Gigabyte Ethernet (1 GigE), 10 GigE, and transparent wavelength services, λ.

It can be appreciated that the second order multi-layer grooming model 150 can include an electrical level that is established by the interconnection of the SONET equipment, e.g., the SONET ADMs 160 and the WDCSs 164. Moreover, the second order multi-layer grooming model 150 can include one or more optical levels established by the interconnection of the optical equipment, e.g., the OADMs 162 and the MSTSs 166. It can also be appreciated that a SONET level is capable of transporting time division multiplexing (TDM) services such as DS-1, DS-3, OC-3 and OC-12. A WDM optical level is capable of carrying OC-192 (10 Gb), 10 GigE, and transparent wavelength services, λ. OC-48, 1 GigE, Enterprise Systems Connectivity (ESCON), Fiber Connectivity (FICON), and Fiber Channel services can be carried over both SONET and WDM optical networks.

As illustrated in FIG. 4, the origination CO 152 can be connected to the destination CO 154 via plural direct CO-to-CO connections 168. The direct CO-to-CO connections 168 can include, e.g., one or more STS-1 connections, one or more OC-3 connections, one or more OC-12 connections, one or more OC-48 (2.5 Gbps) lightpath connections, and/or one or more OC-192 (10 Gb) lightpath connections. The origination CO 152 can also be connected to the first hub node 156 via a first set of spoke connections 170, e.g., one or more STS-1 connections. FIG. 4 further indicates that the first hub node 156 can be connected to the second hub node 158 via plural hub-to-hub connections 172, e.g., one or more STS-1 connections, one or more OC-48 (2.5 Gbps) lightpath connections, and/or one or more OC-192 (10 Gb) lightpath connections. Also, the second hub 158 can be connected to the destination CO 154 via a second set of spoke connections, e.g., one or more STS-1 connections. Finally, FIG. 4 illustrates that the first hub 156 can be connected to the destination CO 154 by plural hub-to-CO cross-connections 176, e.g., one or more STS-1 connections, one or more OC-48 (2.5 Gbps) lightpath connections, and/or one or more OC-192 (10 Gb) lightpath connections.

Figure 5:
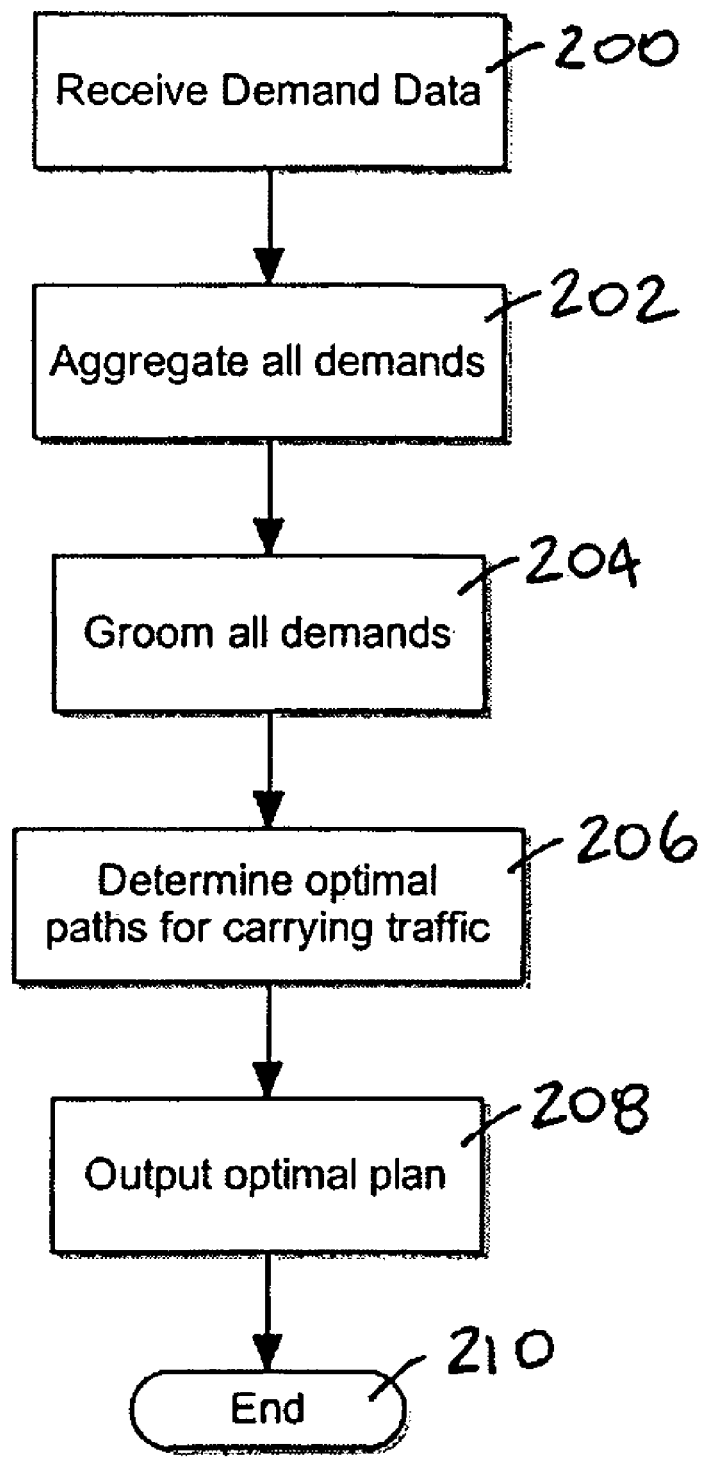
FIG. 5 is a flow chart to illustrate general operating logic of an embodiment of a grooming tool.

FIG. 5 illustrates the general operating logic of an embodiment of a grooming tool. Commencing at block 200, network demand data is received at the grooming tool 22 (FIG. 1). In one embodiment, the network demand data can include published network demand data and unpublished network demand data. The published demand data, for example, can include DS-1 end-to-end speculative forecast for non-switched services with 128, 256, 384, 1.5M, 1.5Z, T1, T1ZF, T1ZFN planning groups. Also, the published network demand data can include DS-3, OC-3, OC-12, and OC-48 high capacity end-to-end demand with 45M, EC1, SN32, SN33, STN, OC-3, STS3, OC-12, STS-12, OC-48, and OC-192 planning groups. Moreover, the published network demand data can include general trunk forecast (GTF) switch services forecasts including message trunk groups, competitive local exchange carrier (CLEC) and local number portability (LNP).

Further, a user, e.g., a network planner, can add other required demands not included in the published forecasts, i.e., 1 GigE, 10 GigE and wavelength demands. The unpublished network demand data can also include end-to-end demands representing asynchronous transition plan by route, copper migration plan, dial-for-dial end-to-end demand, and long distance (LD) demand on interoffice (IOF) transport rings. The unpublished network demand data can also include broadband demand, e.g., ATM, frame relay (FR), Internet, video, etc. Additionally, the unpublished network demand data can include customer specific demands, e.g., inquiries on DS-1, DS-3, OC-3, etc.

Continuing the description of the flow chart depicted in FIG. 5, at block 202, all demands are aggregated. Next, at block 204, all demands are groomed based on the above-described second order multi-layer grooming model 150 (FIG. 4). Proceeding to block 206, the optimal paths for carrying traffic are determined. At block 208, an optimal routing plan including the optimal paths determined above is output. The logic then ends at state 210.

Figure 6:
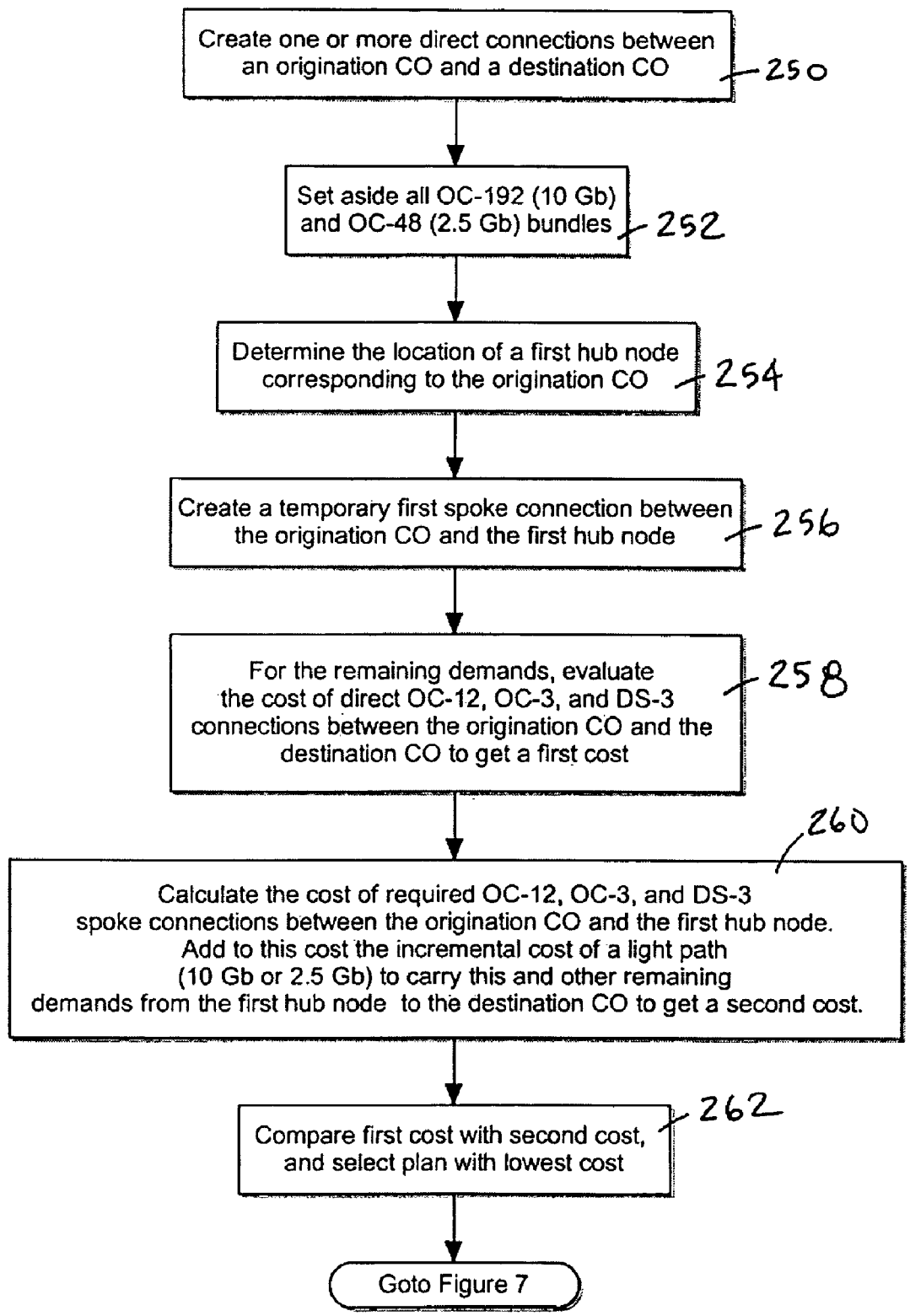
FIG. 6 and FIG. 7 depict a flow chart to illustrate detailed operating logic of an embodiment of a multi-layer grooming tool.

Referring now to FIG. 6, a flow chart to illustrate detailed operating logic of an embodiment of a grooming tool is shown and commences at block 250, where one or more direct connections are created between an origination CO and a destination CO. In the present embodiment, the direct connections can carry a mixture of demand types, and the types of direct connections can be based on the "az" thresholds shown in Table 1. For example, if the demand is greater than a TH12az value then a DS-3 connection is built. Table 2 shows exemplary values for the "az" thresholds and "hz" thresholds for a symmetrical model. So, based on Table 2, if the demand is given as DS-1 bundles and the number of DS-1 bundles exceeds, e.g., twenty (20), then a DS-3 connection can be built. Further, if the demand is given as DS-1 bundles and the number of DS-1 bundles exceeds, e.g., sixty (60), then an OC-3 interface is used. In the present embodiment, the sequence in which the connections should be built is as follows: OC-192 (10 Gb), OC-48 (2.5 Gbps), and STS-1. In other words, if the demand traffic calls for an OC-192 (10 Gb) connection, then an OC-192 (10 Gb) lightpath connection should be built Continuing the description of the flow chart, at block 252, all OC-192 (10 Gb) and OC-48 (2.5 Gbps) bundles are set aside. Proceeding to block 254, the location of a first hub node corresponding to the origination CO is determined. In one embodiment, the location of the first hub node can be based on a user selection and an existing hubbing plan. On the other hand, the direction of each demand can be estimated based on the vertical and horizontal coordinates of the origination CO and destination CO. Then, the shortest hub location path can be assigned to the demand. It can be appreciated that, in general, each demand type can have a different hub location. However, in the present embodiment, it is assumed that the first hub node has the capability and capacity to groom different types of demand in one location.

Moving to block 256, a first set of temporary spoke connections are created between the origination CO and the first hub node. In one embodiment, the temporary spoke connections are STS-1 connections that carry residual DS-1 demand from the origination CO to the first hub node where that demand can be groomed with other residual demand, e.g., from another origination CO. Once groomed, the demand at the first hub node may be large enough to require a direct connection from the first hub node to the destination CO. Otherwise, a temporary hub-to-hub connection can be built from the first hub node to a second hub node and a temporary second spoke connection can be built from the second hub node to the destination CO.

Figure 7:
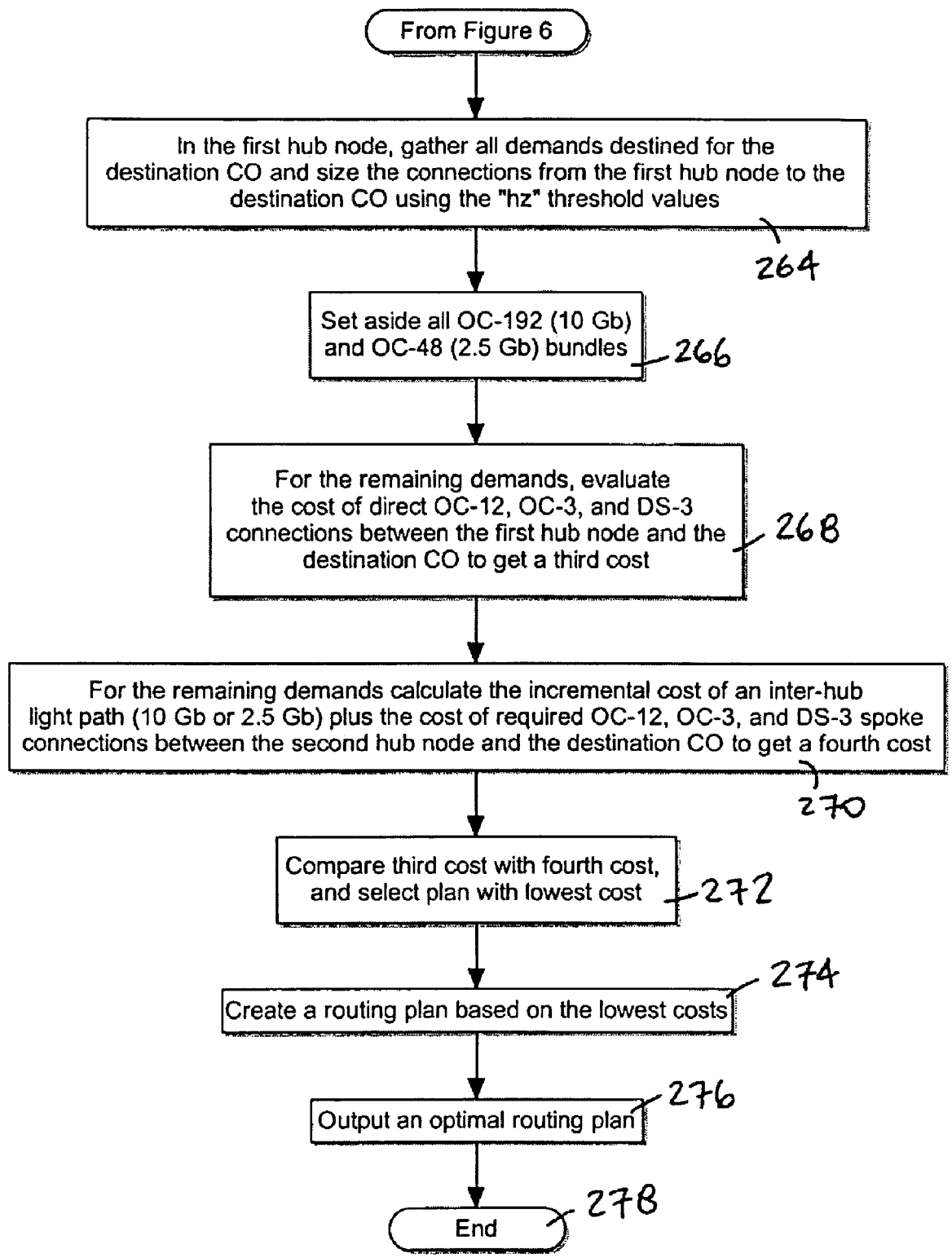

Next, at block 258, the cost of direct STS-1 connections between the origination CO and the destination CO is evaluated for the remaining demands to determine a first cost. At block 260, the cost of required STS-1 spokes between the origination CO and the first hub node is calculated. And, the incremental cost of one or more OC-192 (10 Gb) light path and/or OC-48 (2.5 Gbps) light path to carry this and other remaining demands from the first hub node to the destination CO is added to that cost to get a second cost. In one embodiment, the spare capacities of the first set of temporary spoke connections are used without incurring any cost increase. Continuing to block 262, the first cost is compared to the second cost and the plan with lowest cost is selected. The logic then continues to block 264 of FIG. 7.

At block 264, in the first hub node, all demands destined for the destination CO are gathered. The connections from the first hub node to the destination CO are sized using the "hz" threshold values in Table 1 and the grooming sequence listed above. Next, at block 266, OC-192 (10 Gb) and OC-48 (2.5 Gbps) bundles are set aside to be assigned to lightpaths. Moving to block 268, the cost of direct STS-1 connections between the first hub node and the destination CO are evaluated for the remaining demands to get a third cost. Then, at block 270, the incremental cost of one or more OC-192 (10 Gb) light paths and/or one or more OC-48 (2.5 Gbps) light paths plus the cost of required STS-1 spokes between the second hub node and the destination CO are calculated for the remaining demands to get a fourth cost. In one embodiment, the spare capacities of the second set of temporary spoke connections are used without incurring any cost increase.

Continuing to block 272, the third cost is compared to the fourth cost, and the plan with lowest cost is selected. Thereafter, at block 274, a routing plan based on the lowest costs as determined above is created. At block 276, the routing plan is output. The logic then ends, at state 278.

It can be appreciated that the present method is useful for grooming demand traffic within a multi-level network, e.g., a network having an electrical level and one or more optical levels. Further, the present embodiment can enable the development of efficient transition plans from existing electrical networks to optical networks. Additionally, the method according to the present embodiment can enable network designers to assess and evaluate different hubbing and routing methods and then, select the most efficient one. Also, the present embodiment can enable network designers to provide CO traffic requirements for vendors' equipment selection and configuration evaluation. The method disclosed above can also be used for multi-period planning and network evaluation.

Further, it can be appreciated that by grooming demand traffic using the above-described invention the number of SONET ADMs required by a network can be reduced. As such, the cost of building a network can be reduced. Moreover, the present method can be applied to both ring and mesh topologies having an arbitrary number of nodes under both uniform and non-uniform, i.e., arbitrary, traffic in order to minimize the costs associated with ADMs or OADMs.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

TABLE 1

Threshold Values For Multi-Layer Grooming.

| From To | DS-1/ VT1.5 | DS-3/ STS-1 | OC-3 | OC-12 | OC-48 |
|---|---|---|---|---|---|
| DS-3/STS-1 | TH12az, TH12hz | | | | |
| OC-3* | TH13az, TH13hz | TH23az, TH23hz | | | |
| OC-12* | TH14az, TH14hz | TH24az, TH24hz | TH34az, TH34hz | | |
| OC-48** | TH15az, TH15hz | TH25az, TH25hz | TH35az, TH35hz | TH45az, TH45hz | |
| OC-192** | TH16az, TH16hz | TH26az, TH26hz | TH36az, TH36hz | TH46az, TH46hz | TH56az, TH56hz |

*Interfaces between ADM/NGS, OADM, WDCS and MSTS
**Light path connections

TABLE 2

Exemplary Symmetrical Threshold Values For Multi-Layer Grooming.

| From To | DS-1/ VT1.5 | DS-3/ STS-1 | OC-3 | OC-12 | OC-48 |
|---|---|---|---|---|---|
| DS-3/STS-1 | 20 | | | | |
| OC-3* | 60 | 2 | | | |
| OC-12* | 240 | 9 | 3 | | |
| OC-48 (2.5 Gbps)** | 960 | 34 | 12 | 3 | |
| OC-192 (10 Gbps)** | 3840 | 135 | 45 | 12 | 3 |

*Interfaces between ADM/NGS, OADM, WDCS and MSTS
**Light path connections

What is claimed is:

1. A method of automatically generating a computer based layout of an optical communication network at a network planning computer system, wherein the method is executed from a computer readable storage medium accessible to the network planning computer system, the method comprising:
receiving, at a network planning computer system, communications traffic demand forecast data related to an optical communication network;
receiving, at the network planning computer system, network data corresponding to a deployed optical communication network;
automatically generating, at the network planning computer system, a network plan corresponding to a modified optical communication network to be deployed, the network plan derived from the network data, the network plan constructed in response to performing a grooming operation including a first level of grooming at a first node of the modified network and a second level of grooming at a second node of the modified optical communication network; and
providing the network plan to a display device;
wherein a first threshold is used to perform traffic grooming at the first node and a second threshold is used to perform traffic grooming at the second node.

2. The method of claim 1, wherein the modified optical communication network comprises a multi-layer network, wherein a first layer of the multi-layer network comprises an optical layer and a second layer comprises an electrical layer.

3. The method of claim 2, wherein the first layer includes data connections that operate at a higher transmission capacity than connections within the second layer.

4. The method of claim 3, wherein the modified optical communication network includes:
a third node arid a fourth node, the third node coupled to the first node;
wherein the modified optical communication network includes a first connection between the first node and the third node, a second connection between the first node and the second node, and a third connection between the second node and the third node.

5. The method of claim 4, wherein the modified optical communication network further includes:
a fourth node;
a fourth connection between the second node and the fourth node; and
a fifth connection between the fourth node and the third node;
wherein the second node and the fourth node are hub nodes.

6. The method of claim 5, wherein the first and second connections comprise direct connections and wherein the third connection comprises a spoke connection corresponding to a hub and spoke configuration, the spoke connection having a smaller traffic capacity then the direct connections.

7. The method of claim 6, wherein the spoke connection comprises an STS-1 connection of a SONET network.

8. The method of claim 1, wherein:
the first node is a central office at a first location and includes an optical add drop multiplexer;
the second node is provided by a central office at a destination location and includes an add drop multiplexer;
the third node is provided by a hub that includes a digital cross connect (DCS) and a multi-service transport switch (MSTS).

9. The method of claim 2, wherein the second layer of the multi-layer network comprises a SONET layer and the first layer comprises an optical communication layer including optical add drop multiplexer elements.

10. The method of claim 1, wherein the modified optical communication network comprises a multi-layer network, wherein a first layer comprises a first optical layer, a second layer comprises an electrical layer, and a third layer comprises a second optical layer.

11. A method of grooming multi-layer traffic to generate network node, connection, and wavelength capacity data corresponding to a combined electrical and optical wavelength division multiplexed network, wherein the method is executed from a computer readable storage medium accessible to a network planning computer system, the method comprising:

receiving, at a network planning computer system, traffic demand forecast data;

receiving, at the network planning computer system, network data corresponding to an electrical network and to an optical wavelength division multiplexed network;

aggregating channels of low-speed traffic demand from the electrical network into higher speed connections within the optical wavelength division multiplexed network to create, at the network planning computer system, a network plan for the combined electrical and optical wavelength division multiplexed network; and providing the network plan to a display device, wherein:
   a first set of traffic is aggregated at a first node of the combined electrical and optical wavelength division multiplexed network using a first traffic grooming threshold, and a second set of traffic is aggregated at a second node of the combined electrical and optical wavelength division multiplexed network using a second traffic grooming threshold.

12. The method of claim 11, further comprising deploying a physical multi-layer network in accordance with the network plan for the combined electrical and optical wavelength division multiplexed network.

* * * * *